United States Patent [19]
Miles

[11] Patent Number: 5,145,034
[45] Date of Patent: Sep. 8, 1992

[54] LIFT TRUCK FORK CARRIAGE

[75] Inventor: Kevin L. Miles, Portland, Oreg.

[73] Assignee: Hyster Company, Portland, Oreg.

[21] Appl. No.: 281,486

[22] Filed: Dec. 8, 1988

[51] Int. Cl.⁵ .................... B66B 9/00; B66B 9/20
[52] U.S. Cl. .................... 187/1 R; 187/9 R; 403/199; 403/271
[58] Field of Search ............ 187/9 R, 95, 1 R; 414/785, 628, 629, 630, 631, 632, 633, 634, 635, 724, 592; 403/271, 272, 187, 189, 199

[56] References Cited

U.S. PATENT DOCUMENTS

| | | | |
|---|---|---|---|
| 3,851,732 | 12/1974 | Wagner | 187/9 |
| 4,056,170 | 11/1977 | Chelin | 187/9 R X |
| 4,124,104 | 11/1978 | Yarris | 187/95 |
| 4,426,188 | 1/1984 | Wolf et al. | 414/785 X |
| 4,501,033 | 2/1985 | Kessel et al. | 403/199 |
| 4,544,323 | 10/1985 | Malin | 187/9 R X |
| 4,669,943 | 6/1987 | Zamotin | 414/785 X |

Primary Examiner—Andres Kashnikow
Assistant Examiner—Kenneth DeRosa
Attorney, Agent, or Firm—Tim A. Long

[57] ABSTRACT

The T-shaped join formed by a crossbar and a sideplate of a forklift truck fork carriage is improved by interposing a joint insert member between the crossbar and sideplate. The joint insert member comprises a flange for attachment to the crossabar and, arranged transverse to the flange and projecting beyond the flange, a stem for attachment to the sideplate. The transitions from stem to flange are comprised of strong cast or forged material in the form of smooth, large radii to improve strength and reduce stress concentration.

3 Claims, 3 Drawing Sheets

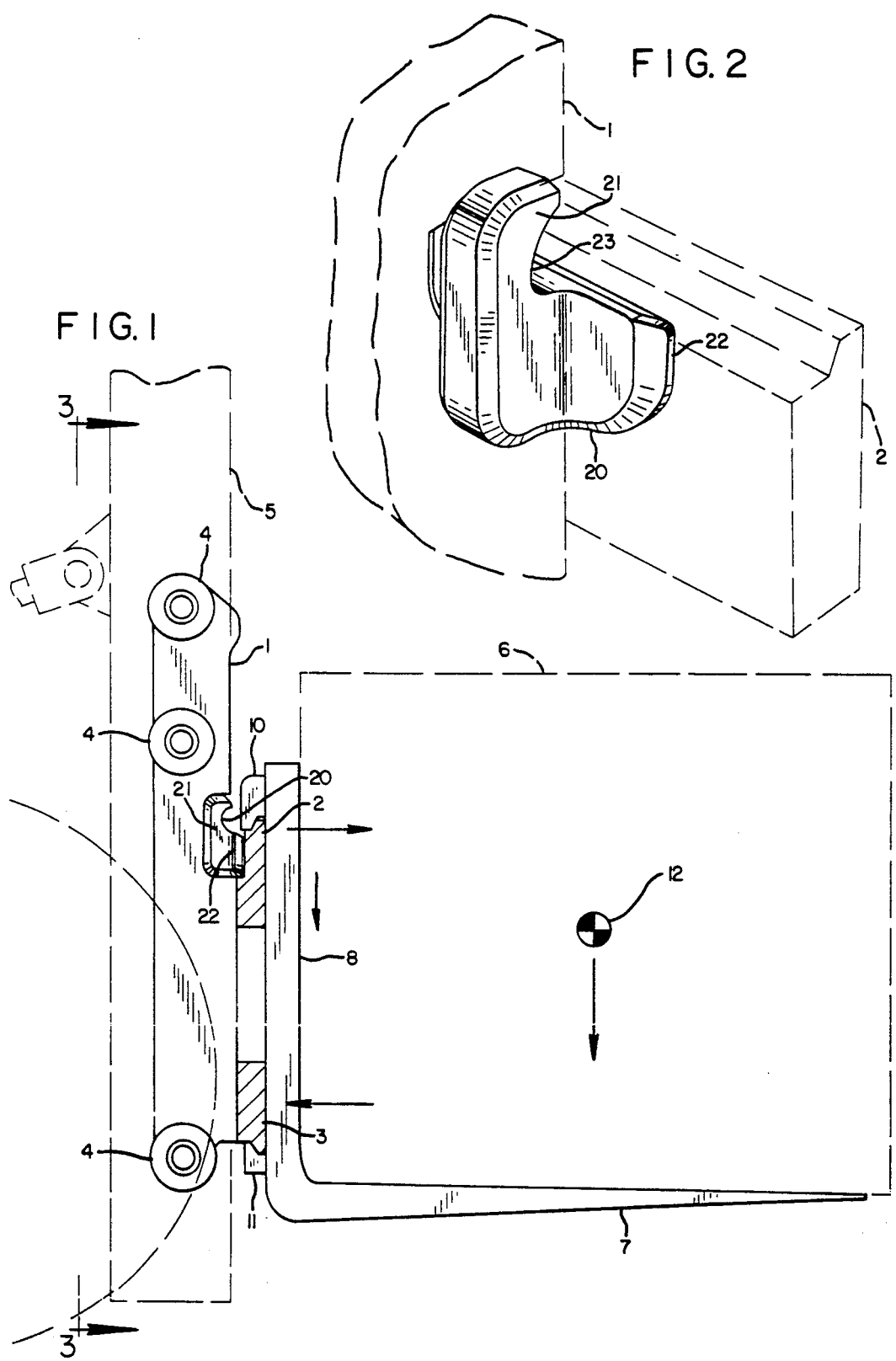

LIFT TRUCK FORK CARRIAGE

BACKGROUND OF THE INVENTION

1. Field of the Invention

The field of art to which this invention pertains is the fork carriage for a forklift truck and, more specifically, to an improved fork carriage structure.

2. Description of the Related Art

The structure of a prior art "hook type" fork carriage for a forklift truck is illustrated in U.S. Pat. Nos. 4,124,104 and 3,851,732. This type of carriage is simple, rugged, economical to manufacture and certain of its dimensions have been standardized to permit the interchangeable installation of forks or a wide variety of specialized load handling attachments produced by a number of manufacturers.

Structurally the carriage comprises two vertical, spaced apart sideplates to which are affixed two transverse horizontal crossbars. The carriage is guided, during vertical movement, by rollers which are attached to the sideplates and engage the vertical channels of the forklift truck's upright or mast assembly. The load engaging means, commonly a pair of forks or a specialized load handling attachment, is attached to the fork carriage by hooks, affixed to the load engaging means and engaging the top crossbar. The bottom crossbar may also be engaged by hooks, but these lower hooks do not contribute to supporting the load.

The load forces are transferred from the top crossbar to the sideplates through the T-shaped joints formed by the intersection of the crossbar and the thickness dimension of the sideplates. The load forces include a shear force, due to the weight of the load, and a tension force necessary to restrain the cantilevered forks. These forces, generated by handling loads with cantilevered forks on an unsprung vehicle, are dynamic and cyclic in nature.

While the prior art fork carriage structure is suitable for use in most fork lift trucks, the shear and tension forces exerted by the top crossbar causes the weld, particularly at the top rear corner of the crossbar, to be highly loaded. The length of this top weld and, as a result, its strength is limited by the thickness of the sideplate. Further, the sharp changes in section in the transition from the sideplate to the crossbar result in stress concentration in the welds used to join the crossbar and sideplate and, as a result of the welding process, additional residual stress and stress concentrating inclusions and cracks can be introduced to the weld material. It has not proven to be practical to fully compensate for the increased loading of higher capacity fork lift trucks by increasing the thickness of the sideplate or the distance between the top and bottom crossbar or by the application of conventional methods of welded joint preparation and stress reduction.

SUMMARY OF THE INVENTION

An improved fork carriage structure is provided by the present invention by the incorporation of a joint insert member in the top crossbar to sideplate joint. The joint insert member comprises a stem and, arranged in rectangular direction to the stem to form a T-shaped crosssection over a portion of the stem's length, a flange. The stem is arranged to be welded to the sideplate and the flange to be welded to the crossbar. Fillets of large radius form the transitions from the stem to the flange and the transition from the upper edge of the flange to the front surface of the stem is formed by groove which undercuts the surface of the stem coincident with the plane of the flange. The concentration of stresses created by the transition from sideplate to crossbar is reduced by the smooth transition and the high strength homogeneous material in the transition. Since the insert is welded at its periphery the effects of heat and any discontinuity in the weld is moved away from the sideplate to crossbar transition. The length of the weld at the top rear corner of the crossbar is limited only by the length of the flange. Stresses in the sideplate to crossbar joint can be significantly reduced when compared to top crossbar to sideplate joints of conventional construction.

BRIEF DESCRIPTION OF THE DRAWINGS

The invention is described below with reference to the accompanying drawings where:

FIG. 1 is right side elevation view of a hook type fork carriage incorporating a joint insert;

FIG. 2 is a right rear oblique view of a top crossbar to sideplate joint having a joint insert member interposed between the sideplate and crossbar;

DESCRIPTION OF THE PREFERRED EMBODIMENT

Figure 3:
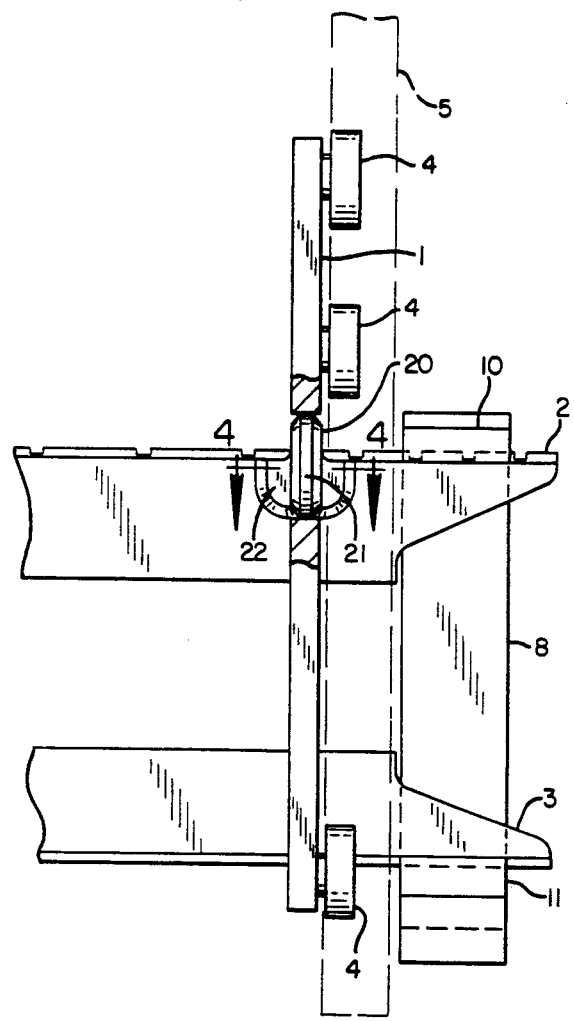
FIG. 3 is a rear view, along line 3—3 of FIG. 1, of one half of a fork carriage including a fragmentary rear view of a top crossbar to sideplate joint having a joint insert member.

The structure of a fork carriage for a forklift truck comprises, basically, two spaced apart vertical sideplates to which are welded to two spaced apart horizontal crossbars. Referring to FIGS. 1 and 3, one of a pair of vertical sideplates 1 is shown with a top crossbar 2 and a bottom crossbar 3 intersecting, in essentially rectangular direction, the front edge of the sideplate. Rollers 4 attached to the sideplate 1 guide the fork carriage in the vertical channels 5 of the forklift's mast assembly.

The load 6 to be handled is typically engaged by a specialized load handling attachment or a pair forks. A fork comprises a horizontal shank 7 and vertical shank 8 joined at a right angle. A top hook 10, affixed to the vertical shank of the fork engages the top crossbar 2 at a shoulder machined in the top surface of the crossbar.

A bottom hook 11 affixed to the vertical shank of the fork engages a similar shoulder on the lower surface of the bottom crossbar 3. However, the bottom hook serves only to restrain the fork if it is lifted and the load forces are transmitted by the top hook 10 and to the top crossbar 2. The fork's lateral position can be altered shifting the fork along the length of the crossbar.

Gravity, acting on the load 6 through its center of gravity 12, causes the top hook to exert both a vertical and a horizontal force on the top crossbar. The vertical force exerted by each hook equals some part of the weight of the load plus the weight of the fork and produces a shear stress in the top crossbar to sideplate joint. Since the fork is free to pivot about the bottom crossbar, the top hook also exerts a horizontal force approximately equal to the vertical force multiplied by the ratio of the horizontal distance from the crossbar to the center of gravity and vertical distance between the top and bottom hooks. The horizontal force results in twisting of the top crossbar about its horizontal axis and, depending upon the lateral position of the fork, bending of the top crossbar about the vertical axis of the top crossbar to sideplate joint. When the fork is displaced laterally outside of the sideplate, as illustrated in FIG. 3, the top crossbar to sideplate joint is subject to a shear force and a tensile force which is highest at the upper, outside corner and lowest at the lower, inside corner of the joint. As a result of handling loads with cantilevered forks on an unsprung vehicle, these forces are dynamic and cyclic in nature affecting the fatigue life o the joint.

Figure 4:
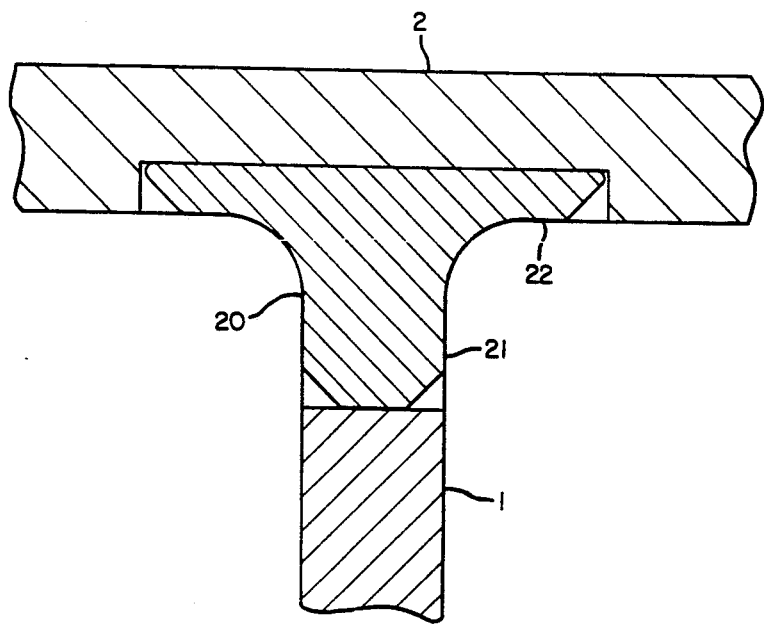
FIG. 4 is a sectional view, along line 4—4 of FIG. 3, illustrating a crosssection of the transition of a top crossbar to sideplate with a joint insert member installed.
Figure 5:
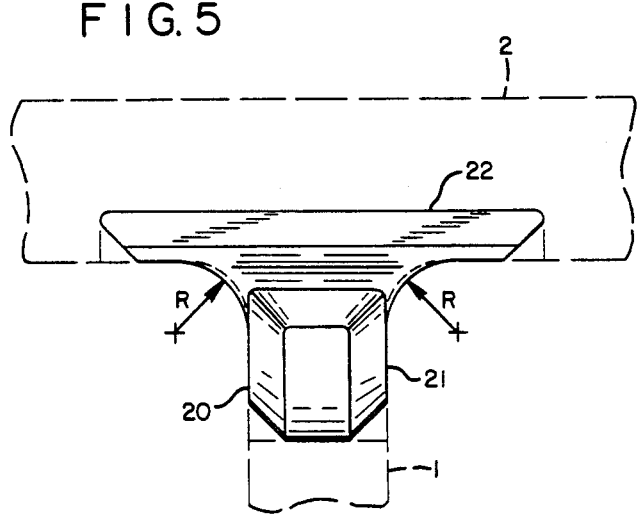
FIG. 5 is a top view of a joint insert member.
Figure 6:
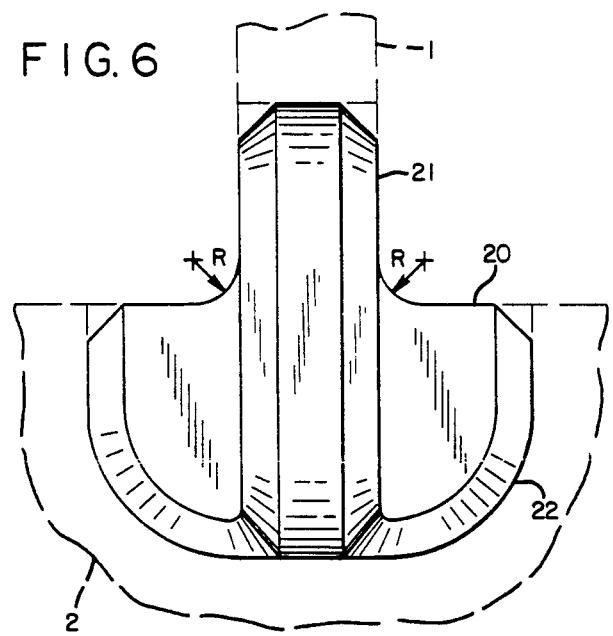
FIG. 6 is a rear view of a joint insert member.
Figure 7:
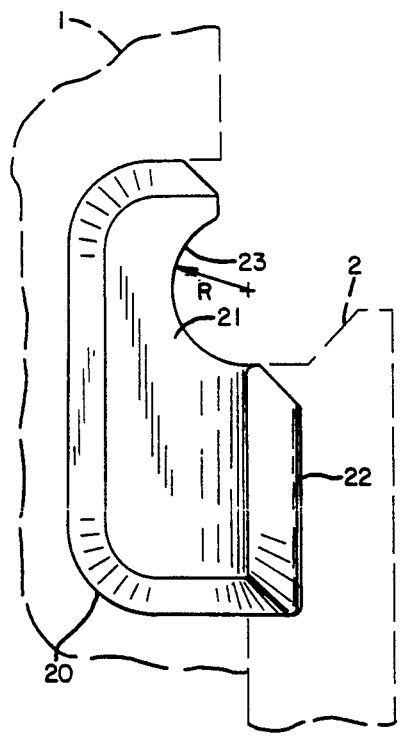
FIG. 7 is a side view of a joint insert member.

In the fork carriage according to the present invention, an upper portion of the joint between the top crossbar 2 and the sideplate 1 comprises a joint insert member 20 interposed between the sideplate and the crossbar, as illustrated in FIG. 2. The joint insert member, as illustrated in FIGS. 5, 6 and 7, comprises a stem 21 and, arranged transverse to the stem to form a T-shaped crosssection, as illustrated in FIG. 4, over a first portion of the stem, a flange 22. To reduce the concentration of stress, fillets of large radii form the transition from the stem to the flange. Prior art studies have shown that stress concentration in a section transition can be significantly reduced by maintaining a fillet radius to section thickness ratio of 0.35 or greater. The transition from the upper edge of the flange to the stem is formed by a large radius transverse groove 23, tangential to the upper edge of the flange and undercutting the surface of the stem coincident with the plane of the flange. Casting or forging with high strength material can produce a joint insert member with smooth fillets of homogeneous material for high strength and long fatigue life.

To assemble the top crossbar to sideplate joint, a groove matching the exterior shape of the flange is machined into the rear surface of the top crossbar. The flange is located in the groove and welded around its periphery. The periphery of the flange of the joint insert member is beveled to promote weld penetration and fatigue strength in the weld. Since welding is remote from the transition from the stem to the flange, stresses induced in the joint by the welding process and stress concentrations in the weld material are located remote from the critical stem to flange section transition.

To assemble the top crossbar to the sideplate, the stem of the joint insert member is located in a notch, matching the rear surface of the joint insert member's stem, cut in the front edge of the sideplate. The large radii of the joint insert member's exterior corners reduce stress concentration in the notch. Again welding is done around the periphery of the stem and remote from the transition from the stem to the flange.

Having described the preferred embodiment of the invention it will be apparent to those skilled in the art that various other forms thereof can be provided without departing from the true spirit and scope of the invention. I claim in my invention all such variations as fall within the scope of the following claims.

What is claimed is:

1. In a forklift truck fork carriage having a sideplate and a crossbar arranged to be joined in rectangular direction, an improved means of attaching a sideplate to a crossbar wherein the improvement comprises:
   a) a joint insert member, having a seam for attachment to the sideplate and a flange arranged transverse to the stem for attachment to the crossbar and further characterized by the projection of the stem beyond the upper edge of the flange, interposed between the crossbar and sideplate.

2. The fork carriage of claim 1 wherein the joint insert member is further characterized by a groove tangential to the upper edge of the plane and undercutting the surface of the seam which is coincident with the plane of the plane.

3. In a fork carriage having a sideplate and a crossbar arranged to be joined in generally rectangular direction an improved means of attaching a sideplate and a crossbar wherein the improvement comprises:
   a) a joint insert member interposed between the sideplate and the crossbar for a portion of he joint and having a flange for attachment to the crossbar and arranged transverse to the plane and having a portion extending beyond the plane with a surface undercut by a groove which is tangential to the edge of the flange, a stem arranged for attachment to the sideplate.

* * * * *